Patented Aug. 18, 1953

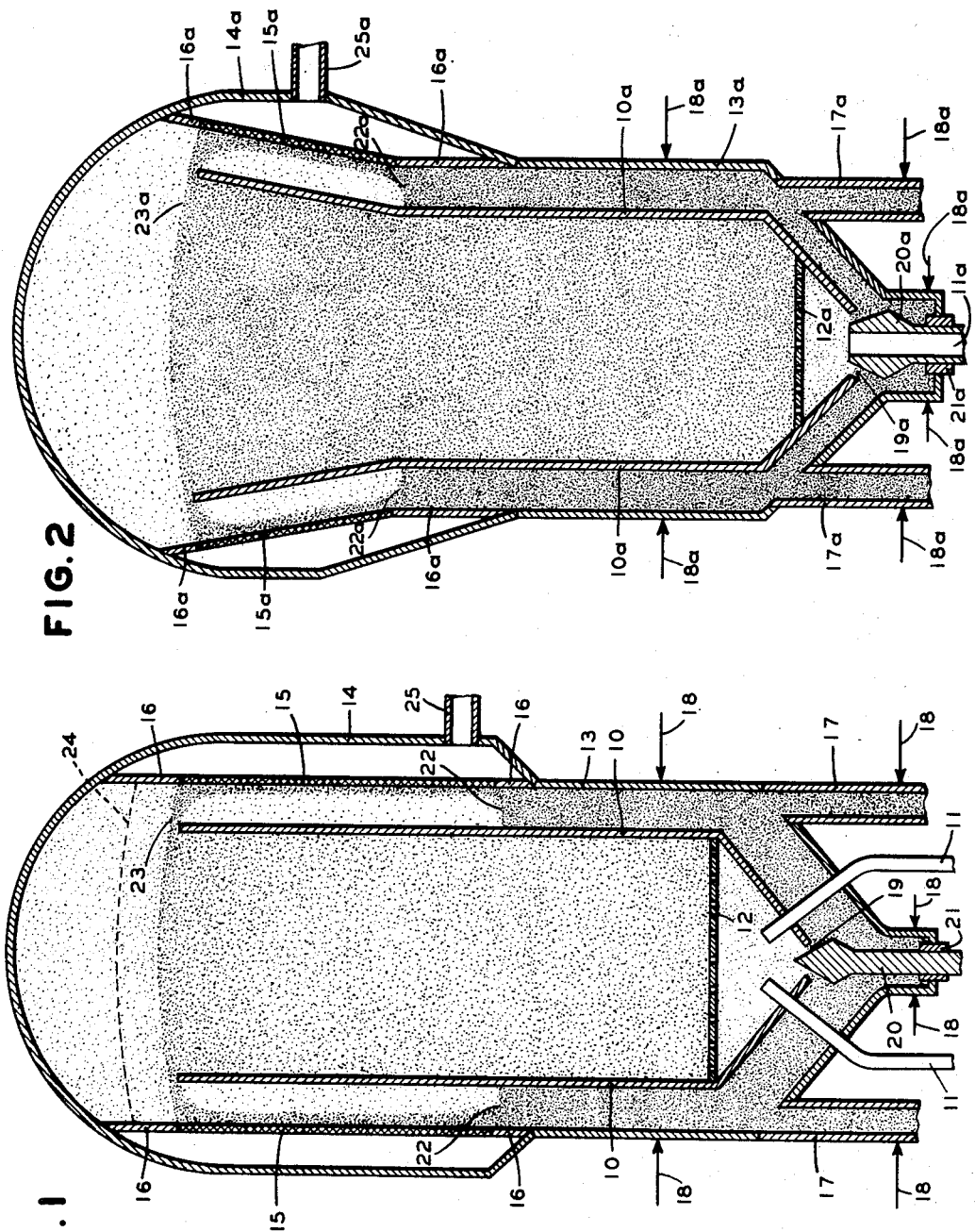

2,649,358

UNITED STATES PATENT OFFICE 2,649,358

CONTACTING GASES AND SOLIDS

George H. Palmer, Fanwood, N. J., assignor to The M. W. Kellogg Company, Jersey City, N. J., a corporation of Delaware Application January 7, 1947, Serial No. 720,659

17 Claims. (Cl. 23—1)

This invention relates to improvements in the separation of gases and vapors from finely divided solids suspended therein. In particular the invention relates to improvements in contacting a gas with finely divided solids. More particularly the invention relates to improvements in method and apparatus for contacting a gas with finely divided solids which are maintained in a contact zone in a dense fluidized pseudo-liquid condition by passing the gas therethrough at a suitable velocity. The treatments which may be carried out in such contact zones include heat exchange between the gas and the solids, catalytic reactions involving a gaseous reactant or involving a finely divided solid contact agent, catalyst, or reactant, thermal conversion treatment by hot finely divided solids, combustion of carbonaceous material on the surfaces of finely divided solids, and distillation of liquids contained in finely divided solids.

In the separation of finely divided solids from gases, in which the solids are suspended, at least partial separation may be effected by simple settling. However, for the separation of relatively finely divided material from flowing gases simple settling is not effective to remove all the suspended solids from the gases. In order to supplement settling various means have been resorted to for separating further amounts of suspended solids from flowing gas streams. Such means include filters, cyclone separators, electrostatic precipitators, and scrubbers. Each of these has certain disadvantages. The filters become caked with finely divided solids and must be cleaned periodically by a reverse flow of gas. Cyclone separators are relatively expensive and do not completely remove suspended solids. Electrostatic precipitators will remove solids not removed by cyclone separators, and ordinarily are employed in conjunction with cyclone separators. However, electrostatic precipitators are expensive to install and maintain and they operate efficiently only at relatively low temperatures. The use of scrubbers to remove solids from a gas stream ordinarily cools the gas stream and requires recovery of solids from the resulting slurry.

It is an object of this invention to provide a method and apparatus for separating gases and vapors from finely divided solids suspended therein, which are free from the disadvantages inherent in methods and apparatus previously proposed for accomplishing the same result. It is a further object of this invention to provide a method and apparatus for contacting gases and vapors with finely divided solids while providing effective and efficient separation of solids from the outgoing gases and vapors. It is a further object of the invention to provide a method and apparatus for separating suspended solids from gases which eliminates or reduces the necessity for reverse flow of gas, lowers the initial and maintenance costs of the equipment, eliminates the recovery of solids from slurries, and separates solids in a highly efficient manner.

In general the invention contemplates the separation of gases (including vapors) from suspended finely divided solids by passing the gases through porous membranes or filters while minimizing the accumulation of solids on the filter surface by the scouring action of a relatively large mass of finely divided solids passed over the filtering surface in impinging contact therewith. For this purpose the porous membrane is arranged in a position to present a substantially vertical, i. e., vertical or nearly vertical, filtering surface. Finely divided solids are passed downwardly over such a surface in impinging contact with the filtering surface. Impinging contact between the solids and the filter surface is brought about by passing a mass of finely divided solids past the filtering surface sufficiently closely to cause most of the particles of the mass to impinge on the filtering surface at least once. This may be brought about by arranging the filtering surface slightly out of the vertical to present a sloping surface to particles which are dropped vertically from above. In this arrangement the filtering surface is arranged out of the vertical only sufficiently to provide good contact between the solids and the filtering surface while avoiding any accumulation of the solids on the filter surface and its direction is included within the definition "substantially vertical." Impinging contact of solids and the filter surface also may be brought about by dropping a plurality of solid particles past a vertical filtering surface and permitting impingement by particles which are driven out of the vertical by a gas stream flowing into the filter. Impinging contact may be brought about also by passing downwardly adjacent the filtering surface a relatively dense fluidized mass of solids which is maintained in an aerated condition and in which the individual particles circulate at a high rate.

The passage of a relatively large quantity of solids, larger than the amount which the gas can carry in suspension at the velocity of filtration, over the filter surface and in impinging contact therewith effectively scours the filter surface and prevents the accumulation of relatively fine particles on such surface.

The invention will be described in more detail by reference to a contact process in which a finely divided solid treating agent is maintained in a relatively dense fluidized pseudo-liquid condition. However, since the invention relates particularly to the separation of gases from finely divided suspended solids after such contact treatment, it is evident that the invention includes within its scope the separation of gases from finely divided solids without reference to the previous condition or relation of the solids and gases.

The finely divided material employed, in accordance with this invention, for scouring the filter surface may be any material suitable for the purpose. Conveniently it may consist of finely divided solids previously separated from the gas stream by settling or other means. However, it may be desirable to employ material differing in composition from the finely divided solids, such as a contact agent, to be separated from the gas stream. It may be desirable to employ finely divided solids which are coarser or harder or more dense than the solids to be separated by filtration, such as sand, metal powders, etc., in order to enhance the scouring effect. Such a material may be employed exclusively as the scouring medium, or a mixture of such dense, hard, finely divided material and finely divided solids previously filtered out of the gas stream may be employed as the scouring medium.

In the contacting processes to which the invention is particularly applicable the gas (or vapor) is contacted with the finely divided materials at a gas velocity such that at least a portion of the solid is entrained in the gas stream at the velocity of contact. Of such entrained solids at least a portion remains entrained in the gas stream at the velocity of filtration, which is the lowest velocity assumed by the gas stream as it approaches the filtering surface. Contact between the gas and the solids may be effected by passing the gas stream into a contact zone into which the solids are separately introduced, or the solids may be introduced directly into a flowing stream of the gas which may be then passed to a suitable contact zone. In accordance with this modification of the invention the finely divided treating agent is caused to accumulate by decreasing the velocity of the stream either in the contact zone or following the contact zone. The accumulated solids are then employed for scouring the filtering surface. Accumulation of the suspended solids results when they are actually settled out of the gas stream, or when they are permitted to settle relative to an upflowing stream of the gas, or when there is formed and maintained a dense fluidized mass of solids in the gas stream.

The invention will be described with particular reference to the last mentioned method of operation, in which the finely divided solid contact agent is maintained in the contact zone in a relatively dense fluidized pseudo-liquid condition by the passage therethrough, at suitable velocity, of the gas (or vapor) being treated. In this method of operation the fluidized powdered solid is maintained in a suitable contact chamber. The gas is introduced into the contact chamber at a low point through one or more inlets whose aggregate cross-sectional area is substantially smaller than the horizontal cross-sectional area of the contact chamber. The gas stream thus enters the contact chamber through inlets in which it travels at a substantially higher velocity than the velocity assumed by the gas stream in the contact chamber. By this means the passage of solids out of the contact chamber through the gas entrances is avoided. In the contact chamber the gas should be passed upwardly at a superficial velocity within the range of 0.2 to 6 feet per second (preferably 0.5 to 4 feet per second). The superficial velocity is the velocity the gas would assume in the contact chamber in the absence of the finely divided solids and at the temperature and pressure to be employed in the process.

The finely divided solids ordinarily are employed in a range of particle sizes, including a large proportion of particles of 1 to 100 microns average diameter. The use of powders consisting of particles of substantially uniform size, in the form of small spheres, also has been suggested. The present invention is applicable to processes employing such "micro-spheres" as well as to processes employing powders having a range of particle sizes.

The passage of the gas stream upwardly through the solids mass at the preferred velocity suspends the solids mass in the stream and maintains the greater part of the solids mass in a fluidized pseudo-liquid condition in which the concentration of solid particles is relatively high. In this dense phase condition the solids may be said to be suspended in the gas stream but not entrained therein in the sense that there is movement of the mass, as such, in the direction of flow of the gas stream.

The dense phase of the solids mass occupies the lower part of the contact chamber, while the upper part of the chamber above the dense phase is occupied by a mixture of gases and powder in which the concentration of solids is much lower than the concentration of solids in the dense phase. This diffuse phase may be said to be a disengaging zone in which some of the solids lifted above the dense phase by the gas stream are disengaged and returned to the dense phase by the action of gravity. The gas stream is withdrawn from the contact chamber at an upper point thereof through an outlet corresponding in aggregate size generally to the size of the gas inlet.

It is characteristic of this "fluidized" system of operation that the settling rate of at least some of the particles of the solids mass is lower than the gas velocity in the contact chamber. Consequently the gas stream tends to entrain and carry out of the contact chamber a small, but appreciable, proportion of the solids mass. In order to retain such solids in the contact chamber, or recover such entrained solids and return them to the system, the contact chamber ordinarily is designed to provide a relatively large volume above the space occupied by the dense phase of the solids mass. This facilitates settling a large proportion of the solids carried upwardly out of the dense phase. To intensify this effect the upper part of the contact chamber may be enlarged in horizontal cross-section to reduce further the linear velocity of the gas stream and promote settling of suspended solids.

The best known commercial process involving continuous contact of gas with a powdered solid under the conditions described above is the "fluidized" catalytic cracking process. In this process hydrocarbon vapors are passed upwardly through a reaction zone containing a mass of powdered cracking catalyst. Catalyst is continuously transferred from the reaction zone to a regeneration zone, in which the catalyst mass is maintained in a fluidized pseudo-liquid condition by suitable control of the velocity of the oxygen-containing stream of regeneration gas. The vapor stream from the reaction zone ordinarily is passed through a series of cyclone separators to remove suspended catalyst, and such removed catalyst ordinarily is returned directly to the dense phase in the reactor. Catalyst not separated from the reaction gases by the cyclone separators is recovered as a slurry by scrubbing the gases with high-boiling hydrocarbon oil. The catalyst is then separated from the slurry, reslurried with liquid charging stock, and returned to the reaction zone. Catalyst is separated from the regeneration gases by means of similar cyclone separators and the regeneration gases pass from the cyclone separators through one or more electrostatic precipitators. Regenerated catalyst separated by the cyclone separators and the electrostatic precipitators is returned either to the regeneration zone or to the reaction zone. Catalyst is continuously transferred from the regeneration zone to the reaction zone, to complete the cycle.

The improved method and apparatus of this invention will be described in detail by reference to the accompanying drawings. In the detailed description the finely divided solids will be referred to as a catalyst powder, and the gas stream passing through the contact chamber will be referred to simply as a gas. It will be understood, however, that the invention is equally applicable to any operation in which any finely divided solid is contacted with any gas under conditions which maintain the finely divided solid in a dense fluidized pseudo-liquid condition by the passage of the gas stream through a mass of the solids at a velocity effective to entrain a part of the solids mass. It will be understood, furthermore, that the invention is applicable to the separation of gases and vapors from finely divided solids suspended therein, regardless of the previous condition or relation of the gases and solids.

Figures 1 and 2 are diagrammatic views in elevation of apparatus for carrying out certain embodiments of the invention. In Fig. 1, a contact chamber 10 is provided to contain a fluidized mass of finely divided solids. The gas or vapor is introduced at a low point in chamber 10 through one or more gas inlet lines 11. A distributor plate 12 is provided in the bottom of chamber 10 to distribute the gas uniformly across the chamber and to sustain the fluidized mass of contact material. Chamber 10 is mounted within a solids circulation vessel 13, with which chamber 10 may be substantially concentric. Vessel 13 is sufficiently larger than chamber 10 to provide a sufficient space outside chamber 10 for the passage of solids downwardly over filtering surfaces and for the return of such solids to the lower part of chamber 10. Vessel 13 is provided with an enlarged upper portion 14 to accommodate the filters. Filter plates 15 are mounted, in frame elements 16, in sufficient number around the circumference of vessel 13 to provide the necessary filtering area. The filter plates 15 may extend around the circumference of vessel 13, or they may extend over only a portion of the circumference of vessel 13. The enlarged upper portion 14 of vessel 13 provides, in combination with filter plates 15, a collection space for the reception of filtered gas.

Filter plates 15 preferably are porous metal filters but they may also be formed of porous ceramic material of the kind ordinarily employed for ceramic filters. They should be sufficiently porous to permit passage of the gas or vapor therethrough but substantially impervious to the solids carried in suspension in the gas. For simplicity of construction and maximum strength filter plates 15 preferably are relatively flat, rectangular plates of uniform thickness. The arrangement of filter plates 15 in the apparatus of Fig. 1 is indicated diagrammatically, and it will be understood that any suitable method of mounting these plates in vessel 13 may be employed. To provide the maximum filtering area it is desirable to provide filter plates completely around the circumference of vessel 13. It will be understood, however, that the use of a filtering area over only a portion of the circumference of vessel 13 is within the scope of the invention.

Solids may be introduced directly into chamber 10 by means not shown in the drawing, or such solids may be introduced into chamber 10 by suspending them in the gas stream flowing into chamber 10 through lines 11. Such solids pass into the lower portion of chamber 10 and are carried up through the openings in plate 12 into the widest part of chamber 10. The horizontal dimension of chamber 10 and the gas flow rate are correlated to produce an upward velocity in chamber 10 sufficiently low to maintain the solids in a dense fluidized pseudo-liquid condition. The quantity of solids which it is desired to maintain in chamber 10 and vessel 13 at all times may be charged to the apparatus independently at the start of the operation, by means not shown, or this quantity of solids may be built up in the apparatus by suitable control of the loading of solids in the gas streams in lines 11. By charging solids through lines 11 at a rate in excess of the carrying capacity of the gas stream in chamber 10 the excess solids accumulate therein and are maintained by the gas stream in a dense fluidized pseudo-liquid condition. In accordance with this modification of the invention the dense fluidized mass of solids is permitted to completely fill chamber 10 to the point where solids flow over the upper edge of chamber 10 into the space between chamber 10 and vessel 13.

Filter plates 15 are arranged for the most part below the upper edge of chamber 10 whereby the solids which pass over the edge of chamber 10 cascade over filter plates 15 in impinging contact with the filtering surface. The gas stream passes upwardly out of chamber 10, and the dense fluidized mass of solids therein, and flows downwardly to and through filter plates 15. The flow of the gas into filter plates 15 tends to carry the falling solid particles toward the filtering surface and into impinging contact therewith.

The solids thus passed downwardly over the filtering surface of the porous membrane are accumulated in the lower part of the annular space between chamber 10 and vessel 13 and are maintained therein in a dense fluidized flowable condition. A portion of the solids may be withdrawn from the system at this point, if desired, by suitable drawoff members 17 which may be standpipes arranged to contain a column of aerated solids to produce a static pressure head. If necessary, stripping and fluidizing gases such as steam or inert gas are introduced through lines 18. Gases thus introduced through lines 18 may be carried downwardly in part by the solids mass and may pass upwardly in part through the solids mass and out through filter plates 15.

Solids which have been passed downwardly over the filtering surfaces of filter plates 15 may be recirculated through chamber 10. For this purpose a suitable opening 19 is provided in the conical bottom of chamber 10, and a plug 20, slideably mounted at 21, is provided to regulate the size of the opening 19. The solids flowing downwardly in the annular space around chamber 10 pass into chamber 10 through opening 19 as the result of the difference in pressure inside and outside chamber 10 at the opening 19. In the bottom of chamber 10 adjacent the exits of lines 11 the pressure to be maintained is that required to overcome the pressure drop through plate 12, the fluidized mass of solids in chamber 10, and the pressure drop through filter plates 15. A higher pressure outside of chamber 10 at opening 19 is provided by suitable regulation of the height and density of the column of fluidized solids in the annular space around chamber 10. This mass of solids is maintained preferably at a relatively high density by retaining therein only sufficient gas to maintain the fluidized condition and, if necessary, to effect stripping. Preferably this density should be sufficiently greater than the density of the solids mass in chamber 10 to produce outside opening 19 a static pressure somewhat greater than the pressure inside opening 19. Preferably the apparatus is constructed to provide below filter plates 15 a sufficient space to maintain a column of solids of sufficient length to provide the necessary static pressure at opening 19.

In accordance with this preferred modification the upper level of this dense fluidized column of solids is maintained just below filter plates 15 as indicated at 22. It is, however, within the scope of the invention to carry the level of the dense catalyst mass in the annular space around chamber 10 at any desired height. If the velocity of circulation of solids around and through chamber 10 is sufficiently great it may be feasible to maintain vessel 13 substantially filled with the dense fluidized solids mass. Thus, instead of having an upper level of a dense mass of catalyst in the annular space at 22 and an upper level of the dense mass of catalyst in chamber 10 at the upper edge thereof at 23, it may be desirable to maintain a fluidized mass of solids which substantially submerges chamber 10, i. e., one having an upper level substantially above chamber 10, as indicated diagrammatically at 24.

The filtered gas emerges from the outer surface of filtering plates 15 and is withdrawn from vessel 13 through one or more suitable exit lines, such as line 25, which connect with the space between the enlarged upper portion 14 of vessel 13 and filter plates 15.

When a sufficient mass of solids is present in chamber 10 and vessel 13 to maintain the desired conditions, as described above, it is necessary to introduce only sufficient further amounts of solids to balance such amounts as are withdrawn directly, as through lines 17. The solids are circulated through and around chamber 10 at a rate which is regulated in accordance with the requirements of the contacting process being carried out and in accordance with the necessity for scouring the filtering surfaces to prevent the accumulation of fines thereon. The rate of circulation is affected by the gas velocity employed in chamber 10, the size of opening 19 as regulated by plug 20, and the relative density of the fluidized masses of solids in and around chamber 10. In the modification illustrated in Fig. 1 the gases pass upwardly and out of the fluidized mass of solids in chamber 10 and then travel downwardly to and through the filter plates 15. The fluidized mass of solids overflows chamber 10 and solid particles cascade downwardly through the annular space around chamber 10 and are carried into impinging contact with filter plates 15 during their passage through this annular space. The circulation of the solid particles and the path of flow of such particles can be indicated only diagrammatically in the drawing, but it is evident that the solid particles which flow over the upper edge of chamber 10 cascade downwardly around chamber 10 and strike the filtering surface of filters 15 one or more times during each passage downwardly through the annular space around chamber 10. Since the flow of the gas stream in this annular space is downward and toward the filter plates it is evident that the falling particles will be carried into impinging contact with the filter surface. It is evident also that the quantity of solids passed over the filtering surface is greater in quantity than that which the gas is capable of carrying in suspension at the velocity of filtration.

The improved method of operation of this invention permits the employment of somewhat higher velocities than are employed in previous operations involving the maintenance of a fluidized mass of solids, since the improved operation eliminates the use of separating devices, such as cyclone separators, which might be overloaded at relatively high gas velocities. This represents an advantage in the improved method and apparatus, since the use of higher linear velocities permits the employment of contact zones of smaller diameter in a more efficient design. The employment of higher velocities also permits the inclusion of particles of somewhat larger sizes than might otherwise be permissible and this in in turn intensifies the scouring effect. The rapid circulation of the solids mass through and around chamber 10 in a fluidized condition may permit the inclusion of particles larger than would be permissible at lower velocities.

It may be desirable to include in the mass of solids two or more different materials. It may be desirable to employ a mixture of a finely divided solid contact agent which is employed for its effect on the gas and a relatively coarse or relatively dense, relatively inert solid which is employed to enhance the scouring effect of the circulating solids on the filter surface.

At relatively low linear gas velocities the circulating solids flow over the upper edge of chamber 10 at a relatively uniform rate. At relatively high velocities, however, the level at 23 fluctuates as the result of the passage of gas bubbles through chamber 10. As the result of such fluctuations successive quantities of solids flow over the upper edge of chamber 10. The fluctuations in the level at 23 are so rapid, however, that the effect on the filter surface is substantially continuous in so far as the scouring effect is concerned.

In accordance with the modification of the invention illustrated in Fig. 1, all the gas passed into chamber 10 through lines 11 passes out through filters 15 and line 25. It may be desirable, however, to maintain a higher linear velocity in chamber 10 than is permitted by the rate of flow of gas through filter plates 15. It may be desirable, therefore, to withdraw a portion of the gas directly from the top of vessel 13 and reintroduce it into the bottom of chamber 10 through lines 11. The relatively small quantity of solids contained in the gas withdrawn from the top of vessel 13 does not interfere with such circulation, although it is within the scope of the invention to separate such solids from this recirculated gas by any suitable means prior to reintroduction of the gas into chamber 10.

In the modification illustrated in Fig. 1 finely divided solids are cascaded downwardly over the filtering surfaces in an amount which is substantially greater than the amount of solids which the gas is capable of carrying in suspension at the velocity of filtration of the gas. This is provided by supplying to the upper edge of chamber 10 a fluidized mass of the solids which is permitted to overflow chamber 10 and permit passage of the solid particles downwardly over the filtering surface. It will be understood, however, that the invention is not limited to this specific means for supplying the excess solids to the filtering surface.

Fig. 2 is generally similar to Fig. 1, with certain modifications which will be described in detail. The operation of the apparatus of Fig. 2 is otherwise identical with the operation of the apparatus of Fig. 1. The various parts of Fig. 2 whose function is identical with the function of a similar part of Fig. 1 are identified by corresponding numerals with the suffix $a$. The description of Fig. 1, therefore, applies also to Fig. 2.

A principal difference between Fig. 2 and Fig. 1 resides in the arrangement of the parts whereby the filter plates 15a are slightly out of the vertical and present an upper filtering surface which is slightly out of the vertical position. This arrangement is provided to enhance the impinging contact with the filtering surface of the solid particles which cascade downwardly from the upper edge of chamber 10a by bringing the filtering surface across the path of flow of the solid particles. The arrangement is advantageous at low velocities of filtration at which the gas has less effect in carrying the solid particles against the filter. To enhance this effect the upper portion of chamber 10a may be flared, as shown in Fig. 2, to carry the upper edge of chamber 10a closer to the filter plates 15a. It will be understood that the inclination of filter plates 15a from the vertical is limited to the degree which enhances contact between the filter plates and the downwardly falling solid particles while avoiding the accumulation of such particles on the filter surface.

The apparatus of Fig. 2 differs from that of Fig. 1 also in the method of introducing the gas stream into the lower portion of chamber 10a. According to this modification plug 20a is provided with a hollow stem through the opening, 11a, in which the gas passes directly into the lower portion of chamber 10a.

I claim:

1. Apparatus for contacting a gas and finely divided solids which comprises an up-flow contact chamber open at the top and having in the lower portion thereof a gas inlet having a cross-sectional area substantially smaller than that of the contact chamber, filter means located outside said chamber and arranged to provide a substantially vertical filtering surface below the upper edge of said chamber, means for confining gas emerging from the top of said chamber within said apparatus and directing said gas to and through said filter means, said filter means being located close to said chamber whereby said substantially vertical filtering surface forms at least a portion of a boundary wall of a confined passageway between said filter means and said chamber whereby finely divided solids overflowing said chamber pass down said passageway past said filtering surface and in impinging contact therewith.

2. Apparatus for contacting a gas and finely divided solids which comprises an up-flow contact chamber open at the top and having in the lower portion thereof a gas inlet having a cross-sectional area substantially smaller than that of the contact chamber, filter means located outside said chamber and arranged to provide a substantially vertical filtering surface below the upper edge of said chamber, means for confining gas emerging from the top of said chamber within said apparatus and directing said gas to and through said filter means, and means for reintroducing into the lower portion of said contact chamber solids passed downwardly past the filtering surface.

3. A method for separating a gas from finely divided solids which comprises passing a gas containing suspended finely divided solids upwardly through a confined passageway formed by an open ended inner vessel arranged within and terminating below the top of an outer vessel having porous side walls impervious to said solids, the velocity of the gas being such that a dense fluidized mass of said solids in the gas is maintained in said confined passageway, and then overflowing said dense fluidized mass of solids from the top of said confined passageway downwardly through the annular space between said outer vessel and said passageway past said porous sidewalls and in impinging contact with the filtering surfaces thereof, whereby the gas passes through the porous side walls of the outer vessel and the solids descend to the bottom of said annular space.

4. A method for separating a gas from finely divided solids suspended therein which comprises passing a stream of gas containing suspended solids to a porous membrane which is arranged substantially vertical and which is substantially impervious to said solids, said porous membrane permitting the gas to pass therethrough and at least some of the suspended solids to remain adhering to the surface thereof, and passing a portion of finely divided solids in addition to the amount of solids which are present as a suspension in the aforesaid gas stream downwardly over the surface of the porous membrane on the same side at which the solids are adhering thereto in order to scour the same therefrom.

5. A method for separating finely divided solids from an upflowing gas stream in which said solids are suspended which comprises reducing the velocity of said gas stream such that a portion of the suspended solids disengage therefrom and thus forms an accumulated mass of solids through which the upflowing gas steam passes, passing the gas emerging from the accumulated mass of solids and which contains finely divided solids entrained therewith to a porous membrane which is substantially impervious to the solids and which is arranged to present a substantially vertical filtering surface to upflowing gas containing entrained solids, said porous membrane permitting the gas to pass therethrough and at least some of the entrained solids to remain adhering to the surface of the porous membrane, and passing downwardly over the surface of the said porous membrane on the same side at which the entrained solids are adhering thereto a portion of finely divided solids from the accumulated mass of solids in addition to the amount of solids which are entrained in the gas emerging therefrom in order to scour adhering solids from the surface of the porous membrane.

6. A method of separating a gas from finely divided solids after the gas has been passed upwardly through a mass of finely divided solids which is maintained in a dense fluidized pseudo-liquid condition by the passage of gas therethrough at relatively low velocity, which comprises passing a gas emerging from the top of the said fluidized mass and containing entrained solids to a porous membrane which is substantially impervious to the solids and which presents a filtering surface substantially vertical to the inflowing gas containing entrained solids, said porous membrane permitting the gas to pass therethrough and at least some of the entrained solids to remain adhering to the surface thereof, and passing a portion of finely divided solids from the said fluidized mass in addition to the amount which is entrained in the gas emerging from the top of said fluidized mass downwardly over the surface of the porous membrane on the same side at which the entrained solids are adhering to the porous membrane in order to scour the same therefrom.

7. A method for separating finely divided solids from a stream of gas in which said solids are carried in suspension, which comprises reducing the velocity of the stream to separate therefrom a portion of the suspended solids thus forming a fluidized mass thereof, passing the gas stream containing entrained solids after such a separation to a porous membrane which is substantially impervious to said solids and which is arranged to present a substantially vertical filtering surface to the inflowing gas containing entrained solids, said porous membrane permitting the gas to pass therethrough and at least some of the entrained solids to remain adhering to the surface thereof, and passing a portion of finely divided solids from the said fluidized mass in addition to the quantity which is entrained in the gas stream downwardly over the surface of the porous membrane on the same side at which the entrained solids are adhering to the porous membrane in order to scour the same therefrom, the quantity of finely divided solids employed for scouring the surface of the porous membrane being greater than the quantity of the said entrained solids.

8. A method for separating a gas from finely divided solids suspended therein, which comprises passing the gas as a stream upwardly through an enlarged zone at a velocity sufficiently low to maintain a dense fluidized pseudo-liquid mass of solids in said zone, passing the gas stream from the top of said pseudo-liquid mass of solids at a velocity at which some of the solids remain entrained therein, passing the gas stream containing the entrained solids to a porous membrane which is substantially impervious to said solids and which is arranged to present a substantially vertical filtering surface to the inflowing gas containing entrained solids, said porous membrane permitting the gas to pass therethrough and at least some of the solids to remain adhering to the surface thereof, passing a portion of solids from the said dense fluidized mass in addition to the quantity which is entrained in the aforesaid gas stream downwardly over the surface of the porous membrane on the same side at which the entrained solids are adhering in order to scour the same therefrom.

9. A method for separating a gas from finely divided solids suspended therein which comprises passing a stream of gas containing suspended solids to a porous membrane which is substantially impervious to said solids and which is arranged to present a filtering surface slightly inclined from a vertical position in the direction away from the stream of the inflowing gas containing suspended solids, said porous membrane permitting the gas to pass therethrough and at least some of the solids to remain adhering to the surface thereof, and passing a portion of finely divided solids in addition to the amount which is suspended in the aforesaid gas stream downwardly onto said sloping filtering surface whereby the solids adhering thereto are scoured therefrom, the mass of finely divided solids employed in scouring the surface of the porous membrane greater in quantity than that which is suspended in the aforesaid gas stream.

10. A method for contacting a gas with finely divided solids, which comprises passing a stream of said gas through a contact zone in which the said gas stream is contacted with the said finely divided solids, the gas stream being passed through said contact zone at a velocity effective to transport solids in suspension therein, passing the gas stream containing some entrained solids after contact with the solids in the contact zone to a porous membrane which is substantially impervious to entrained solids and which is arranged to present a substantially vertical filtering surface to the inflowing gas stream, said porous membrane permitting the passage of gas therethrough and at least some of the entrained solids to remain adhering to the surface thereof, and passing a portion of finely divided solids in addition to the quantity which is entrained in the aforesaid gas stream downwardly over the surface of the porous membrane on the same side at which solids are adhering thereto in order to scour same therefrom.

11. A method for treating a gas with a finely divided contact agent which comprises passing a stream of said gas through a contact zone in which is situated the finely divided contact agent, said gas stream being passed through the contact zone at a velocity effective to transport finely divided contact agent in suspension thereof, flowing the gas stream containing entrained contact agent after the contact treatment to a porous membrane which is arranged to present a substantially vertical filtering surface to the inflowing gas stream containing contact agent and which is substantially impervious to the solids thereby causing the gas to pass therethrough and at least some of the solids to remain adhering on the surface thereof, passing a portion of finely divided solids larger in particle size than said contact agent downwardly over the surface of the porous membrane to which solids are adhering in order to scour the same therefrom, said portion of relatively larger finely divided material which is passed over the surface of the porous membrane being greater in quantity than that of the finely divided material which is in suspension in the aforesaid gas stream.

12. A method for treating a gas with a finely divided solid contact agent which comprises passing a stream of said gas upwardly through a contact zone containing a mass of finely divided solids comprising particles of said contact agent and particles of more dense material than the particles of contact agent, passing the gas upwardly through such mass at a velocity sufficient to maintain the particles in a dense fluidized pseudo-liquid condition, passing the gas containing entrained particles out of said contact zone to a porous membrane which is arranged to present a substantially vertical filtering surface to the incoming gas containing entrained particles and which is substantially impervious to the entrained solids thereby causing the gas to pass therethrough and at least some of the entrained solids to remain adhering to the surface thereof, and passing a portion of the solids from the fluidized mass in said contact zone in addition to the quantity which is entrained in the gas stream downwardly over the surface of the porous membrane on the same side at which solids are adhering thereto in order to scour the same therefrom, the quantity of solids employed for scouring the surface of the porous membrane being greater than the quantity of said entrained solids.

13. A method for separating a gas from finely divided solids suspended therein which comprises passing continuously a stream of gas containing suspended solids to a porous membrane which is arranged to present a substantially vertical filtering surface to the incoming gas containing suspended solids and which is substantially impervious to said solids and thereby causing the gas to pass therethrough and at least some of the solids to remain adhering to the surface thereof, continuously passing a mass of finely divided solids in addition to the amount which is suspended in the aforesaid gas stream downwardly over the surface of the said porous membrane on the side at which solids are adhering thereto in order to scour the same therefrom, recovering the mass of solids employed for scouring said porous membrane, and repassing the recovered solids downwardly over the surface of the porous membrane on the same side at which solids are adhering thereto for scouring the same therefrom.

14. A method for separating a gas from finely divided solid catalyst particles suspended therein which comprises passing a stream of gas containing suspended catalyst to a porous membrane which is substantially impervious to the catalyst being transported in said gas and which is arranged to present to the inflowing gas a substantially vertical filtering surface, said porous membrane permitting the gas to pass therethrough and at least some of the suspended catalyst to remain adhering to the surface thereof, passing a portion of finely divided solids in addition to the quantity of catalyst which is suspended in the aforesaid gas stream downwardly over the surface of the said porous membrane on the same side at which solids are adhering thereto in order to scour the same therefrom, the quantity of solids employed for scouring adhering catalyst being greater than the quantity of catalyst suspended in the aforesaid gas stream.

15. A method for separating a gas from entrained finely divided solid catalyst after the gas has been passed upwardly through a mass of said finely divided solid catalyst which is maintained in a dense fluidized pseudo-liquid condition by the passage of the gas upwardly therethrough at a relatively low velocity, which comprises passing the gas emerging from the fluidized mass of catalyst and containing entrained catalyst to a porous membrane which is substantially impervious to said catalyst and which is arranged to present to the inflowing gas a substantially vertical filtering surface, said porous membrane permitting the passage of gas therethrough and at least a portion of the entrained catalyst to remain adhering thereto, passing a portion of the catalyst from the aforesaid fluidized catalyst mass in addition to the quantity of entrained catalyst in the aforesaid gas stream downwardly over the surface of the porous membrane on the same side at which the said entrained solids are adhering thereto in order to scour the same therefrom, the quantity of the catalyst employed for scouring the surface of the porous membrane being substantially greater than the quantity of entrained catalyst which is present in the gas emerging from the fluidized mass of catalyst.

16. A method for treating a gas with finely divided solids, which comprises forming a suspension of said solids in said gas, flowing said gas and said solids in a contact zone from a low point therein with said solids in suspension in said gas, withdrawing the gas from the top of said contact zone as a more dilute suspension of solids than is present in the contact zone and passing same to a porous membrane which is substantially impervious to said solids and arranged to present to the inflowing gas a substantially vertical filtering surface, said porous membrane permitting the gas to pass therethrough and at least a portion of the suspended solids to remain adhering on the surface thereof, withdrawing the solids which are present in the contact zone from the top thereof and passing same downwardly over the surface of the porous membrane on the same side at which solids are adhering thereto in order to scour the adhering solids from the surface therefrom, the amount of solids withdrawn from the contact zone for scouring said membrane being greater than the amount of solids which are suspended in the gas which is withdrawn from the top of the contact zone.

17. A method for treating a gas with finely divided solids which comprises forming a suspension of said solids in said gas and flowing the gaseous suspension of solids upwardly in a contact zone from a low point therein, allowing a substantial amount of the solids to become disengaged from the gas at the top of the contact zone, withdrawing the gas containing entrained solids from the top of the contact zone and passing same to a porous membrane which is substantially impervious to the entrained solids and arranged to present to the inflowing gas substantially vertical filtering surface, said porous membrane permitting the gas to pass therethrough and at least a portion of the said entrained solids to remain adhering on the surface thereof, flowing the disengaged solids in the contact zone from the top thereof and passing same downwardly over the surface of the porous membrane on the same side at which the entrained solids are adhering thereto in order to scour same therefrom, passing the downwardly flowing mass of solids to the point at which said solids are suspended in a gas, resuspending the solids in further quantities of gas for repassage through said contact zone, and maintaining the solids flowing downwardly toward the point of suspension as a dense fluidized column of said solids.

GEORGE H. PALMER.

References Cited in the file of this patent

UNITED STATES PATENTS

| Number | Name | Date |
|---|---|---|
| 2,377,657 | Watts | June 5, 1945 |
| 2,379,734 | Martin | July 3, 1945 |
| 2,429,751 | Gohr et al. | Oct. 28, 1947 |
| 2,526,651 | Garbo | Oct. 24, 1950 |